United States Patent
Shen et al.

(10) Patent No.: US 10,567,796 B2
(45) Date of Patent: Feb. 18, 2020

(54) SYSTEMS, DEVICES AND METHODS FOR VIDEO ENCODING AND DECODING

(71) Applicant: Hangzhou Hikvision Digital Technology Co., Ltd., Hangzhou (CN)

(72) Inventors: Linjie Shen, Hangzhou (CN); Shiliang Pu, Hangzhou (CN); Xiaoyang Wu, Hnagzhou (CN); Hui Su, Hangzhou (CN); Hai Yu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 485 days.

(21) Appl. No.: 14/995,243

(22) Filed: Jan. 14, 2016

(65) Prior Publication Data

US 2016/0212444 A1 Jul. 21, 2016

(30) Foreign Application Priority Data

Jan. 16, 2015 (CN) .......................... 2015 1 0024059

(51) Int. Cl.
*H04N 19/895* (2014.01)
*H04N 19/103* (2014.01)
(Continued)

(52) U.S. Cl.
CPC ......... *H04N 19/593* (2014.11); *H04N 19/105* (2014.11); *H04N 19/107* (2014.11);
(Continued)

(58) Field of Classification Search
CPC .. H04N 19/593; H04N 19/105; H04N 19/107; H04N 19/109; H04N 19/137;
(Continued)

(56) References Cited

U.S. PATENT DOCUMENTS 6,546,052 B1 * 4/2003 Maeda ................ H04N 19/503
348/397.1
6,999,620 B1 * 2/2006 Harville ............. G06K 9/00362
382/103

(Continued)

FOREIGN PATENT DOCUMENTS

CN 101742321 6/2010
CN 101883284 11/2010
(Continued)

OTHER PUBLICATIONS

U.S. Appl. No. 14/994,270, filed Jan. 13, 2016, Chen et al.
(Continued)

*Primary Examiner* — Jamie J Atala
*Assistant Examiner* — Patrick E Demosky
(74) *Attorney, Agent, or Firm* — Jones Day

(57) ABSTRACT

Systems, devices and methods are provided for video encoding and decoding. An example method includes: analyzing one or more input images; obtaining a background image from the one or more input images; encoding the background image to obtain a background frame; decoding the background frame to obtain a reconstructed image of the background frame; obtaining a first image from the one or more input images; encoding at least partially the first image to obtain a refreshment frame based at least in part on a difference between the first image and the reconstructed image of the background frame; obtaining a second image from the one or more input images; encoding at least partially the second image to obtain a common frame; and generating a video bit stream based at least in part on the background frame, the refreshment frame and the common frame.

22 Claims, 18 Drawing Sheets

(51) Int. Cl.

| | |
|---|---|
| *H04N 19/593* | (2014.01) |
| *H04N 19/46* | (2014.01) |
| *H04N 19/105* | (2014.01) |
| *H04N 19/107* | (2014.01) |
| *H04N 19/17* | (2014.01) |
| *H04N 19/137* | (2014.01) |
| *H04N 19/109* | (2014.01) |
| *H04N 19/51* | (2014.01) |
| *H04N 19/507* | (2014.01) |

(52) U.S. Cl.
CPC ......... *H04N 19/109* (2014.11); *H04N 19/137* (2014.11); *H04N 19/17* (2014.11); *H04N 19/46* (2014.11); *H04N 19/507* (2014.11); *H04N 19/51* (2014.11)

(58) Field of Classification Search
CPC ...... H04N 19/17; H04N 19/46; H04N 19/507; H04N 19/51; H04N 19/895; H04N 19/103
See application file for complete search history.

(56) References Cited

U.S. PATENT DOCUMENTS

| | | |
|---|---|---|
| 7,016,411 B2 | 3/2006 | Azuma et al. |
| 9,232,233 B2 | 1/2016 | Zhou et al. |
| 2008/0247469 A1* | 10/2008 | Vadapalli ......... H04N 19/00187 375/240.27 |
| 2012/0169923 A1* | 7/2012 | Millar .................... H04N 19/23 348/399.1 |

FOREIGN PATENT DOCUMENTS

| | | | |
|---|---|---|---|
| CN | 103179402 A | | 6/2013 |
| CN | 104053006 A | * | 9/2014 |
| WO | WO 2003/084235 A1 | | 10/2003 |
| WO | WO 2007/093199 | | 8/2007 |
| WO | WO 2010/043140 | | 4/2010 |

OTHER PUBLICATIONS

U.S. Appl. No. 14/995,256, filed Jan. 14, 2016, Chen et al.
Chinese Search Report dated May 18, 2018 in connection with CN2015100240599 (English translation included).
Chinese Office Action dated Jun. 4, 2018 in connection with CN2015100240599 (English translation included).
Chinese Office Action dated Feb. 25, 2019 in connection with CN2015101310315 (English translation included) CN2015100240599.
European Patent Office; European Search Report and European Search Opinion dated Oct. 19, 2016 in connection with EP16154510.
English translation of Notification to Grant Patent Right for Invention dated Sep. 19, 2019 in connection with CN2015100240599.
European Office Action, in Application EP 16154510.8; dated May 18, 2018.

* cited by examiner

SYSTEMS, DEVICES AND METHODS FOR VIDEO ENCODING AND DECODING

CROSS-REFERENCES TO RELATED APPLICATIONS

The application claims priority to Chinese Patent Application No. 201510024059.9, filed Jan. 16, 2015, incorporated by reference herein for all purposes.

BACKGROUND

With the development of the society, video surveillance systems become more and more widely applied to meet ever-increasing security needs. As high quality video data often requires a large amount of storage resource, video compression technology develops continuously to reduce storage costs. However, most conventional video compression standards are not formulated for surveillance-use scenarios, and conventional compression technologies still result in a relatively high amount of information redundancy when used in video surveillance scenarios which are usually motionless. Therefore, an encoding method for surveillance environments to obtain same image quality at lower bit rates is needed to lower video storage costs.

In video encoding systems, an encoder may make use of different encoding technologies to compress video data. For example, one commonly used technology is predictive encoding. FIG. 1 is an example diagram showing a predictive encoding method. In a video stream, I Frames can be independently encoded using a spatial predictive encoding method. P Frames can be encoded using a temporal predictive encoding method and may need to use other frames as references for encoding. A P Frame can be encoded using a single previously encoded frame as a reference, or can also be encoded using multiple previously encoded frames as references. The frame(s) used by the P Frame as a reference(s) is/are called reference frame(s). When a P Frame is encoded, appropriate selection of reference frame(s) can result in better encoding quality or a lower encoding bit rate. However, to reduce encoding complexity and lower internal storage costs, the conventional encoding methods generally only store one reference frame, so that in many scenarios, no suitable matching blocks can be found (e.g., when a new background is exposed after an object moves).

Usually, the compression efficiency for P Frames processed with the temporal predictive encoding method is far greater than that of I Frames processed with the spatial predictive encoding method. Therefore, to improve compression efficiency, P Frames may be preferred for encoding over I Frames. However, for video encoding, an I Frame is often encoded once in a while mostly for two reasons: fast response for random frame location during playback, and reduction/prevention of error accumulation and spread resulting from predictive quantization.

Conventional encoding methods often have disadvantages. For example, when the conventional methods are used for video surveillance systems which primarily deal with motionless scenes, a large amount of redundant background information is encoded for I Frame encoding.

Hence it is highly desirable to improve the techniques for video encoding and decoding, e.g., to improve compression efficiency of surveillance videos.

BRIEF SUMMARY

According to one embodiment, a method for video encoding includes: analyzing one or more input images; obtaining a background image from the one or more input images; encoding the background image to obtain a background frame using an intra-frame-predictive-encoding method; decoding the background frame to obtain a reconstructed image of the background frame; obtaining a first image from the one or more input images; encoding at least partially the first image to obtain a refreshment frame using an inter-frame-predictive-encoding method based at least in part on a difference between the first image and the reconstructed image of the background frame; obtaining a second image from the one or more input images; encoding at least partially the second image to obtain a common frame using the inter-frame-predictive-encoding method based at least in part on differences between the second image and the reconstructed image of the background frame and between the second image and a reconstructed image of an adjacent preceding frame, or based at least in part on a difference between the second image and the reconstructed image of the adjacent preceding frame; and generating a video bit stream based at least in part on the background frame, the refreshment frame and the common frame.

According to another embodiment, a method for video decoding includes: analyzing a video bit stream to obtain a background frame, a refreshment frame and a common frame; decoding the background-frame bit stream using an intra-frame-predictive-decoding method of to obtain a reconstructed image of the background frame; decoding at least part of a refreshment frame using an inter-frame-predictive-decoding method based at least in part on the reconstructed image of the background frame to obtain a reconstructed image of the refreshment frame; and decoding at least part of a common frame using an inter-frame-predictive-decoding method based at least in part on the reconstructed image of the background frame and a reconstructed image of an adjacent preceding frame, or based at least in part on the reconstructed image of the adjacent preceding frame to obtain a reconstructed image of a common frame.

According to yet another embodiment, a device for video encoding includes: a background-image-acquisition module operable to analyze one or more input images and obtain a background image from the one or more input images; a background-frame-encoding module operable to encode the background image to obtain a background frame using an intra-frame-predictive-encoding method and decode the background frame to obtain a reconstructed image of the background frame; a refreshment-frame-encoding module operable to obtain a first image from the one or more input images and encode at least partially the first image to obtain a refreshment frame using an inter-frame-predictive-encoding method based at least in part on a difference between the first image and the reconstructed image of the background frame; a common-frame-encoding module operable to obtain a second image from the one or more input images and encode at least partially the second image to obtain a common frame using the inter-frame-predictive-encoding method based at least in part on differences between the second image and the reconstructed image of the background frame and between the second image and a reconstructed image of an adjacent preceding frame, or based at least in part on a difference between the second image and the reconstructed image of the adjacent preceding frame; a bit-stream-generation module operable to generate a video bit stream based at least in part on the background frame, the refreshment frame and the common frame.

In one embodiment, a device for video decoding includes: a bit-stream-analysis module operable to analyze a video bit stream to obtain a background frame, a refreshment frame and a common frame; a background-frame-decoding module operable to decode the background-frame bit stream using an intra-frame-predictive-decoding method of to obtain a reconstructed image of the background frame; a refreshment-frame-decoding module operable to decode at least part of a refreshment frame using an inter-frame-predictive-decoding method based at least in part on the reconstructed image of the background frame to obtain a reconstructed image of the refreshment frame; and a common-frame-decoding module operable to decode at least part of a common frame using an inter-frame-predictive-decoding method based at least in part on the reconstructed image of the background frame and a reconstructed image of an adjacent preceding frame, or based at least in part on the reconstructed image of the adjacent preceding frame to obtain a reconstructed image of a common frame.

In another embodiment, a system for video encoding includes: one or more data processors; and one or more non-transitory computer-readable storage media encoded with instructions for commanding the data processors to execute certain operations. The operations includes: analyzing one or more input images; obtaining a background image from the one or more input images; encoding the background image to obtain a background frame using an intra-frame-predictive-encoding method; decoding the background frame to obtain a reconstructed image of the background frame; obtaining a first image from the one or more input images; encoding at least partially the first image to obtain a refreshment frame using an inter-frame-predictive-encoding method based at least in part on a difference between the first image and the reconstructed image of the background frame; obtaining a second image from the one or more input images; encoding at least partially the second image to obtain a common frame using the inter-frame-predictive-encoding method based at least in part on differences between the second image and the reconstructed image of the background frame and between the second image and a reconstructed image of an adjacent preceding frame, or based at least in part on a difference between the second image and the reconstructed image of the adjacent preceding frame; and generating a video bit stream based at least in part on the background frame, the refreshment frame and the common frame.

In another embodiment, a system for video decoding includes: one or more data processors; and one or more non-transitory computer-readable storage media encoded with instructions for commanding the data processors to execute certain operations. The operations includes: analyzing a video bit stream to obtain a background frame, a refreshment frame and a common frame; decoding the background-frame bit stream using an intra-frame-predictive-decoding method of to obtain a reconstructed image of the background frame; decoding at least part of a refreshment frame using an inter-frame-predictive-decoding method based at least in part on the reconstructed image of the background frame to obtain a reconstructed image of the refreshment frame; and decoding at least part of a common frame using an inter-frame-predictive-decoding method based at least in part on the reconstructed image of the background frame and a reconstructed image of an adjacent preceding frame, or based at least in part on the reconstructed image of the adjacent preceding frame to obtain a reconstructed image of a common frame.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
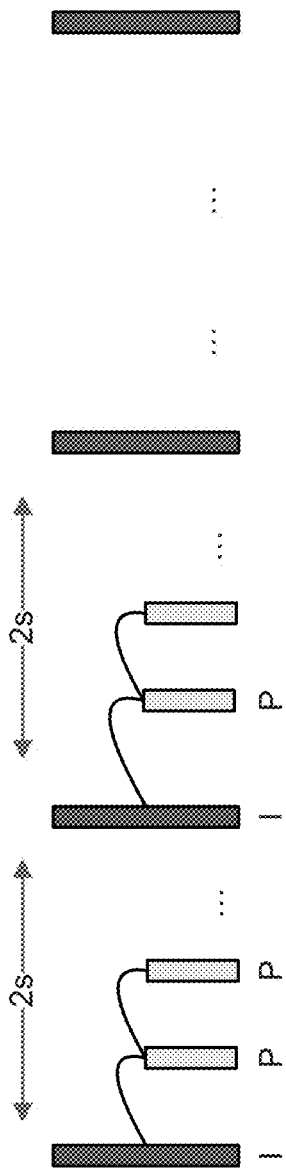
FIG. 1 is an example diagram showing a predictive encoding method.
Figure 2:
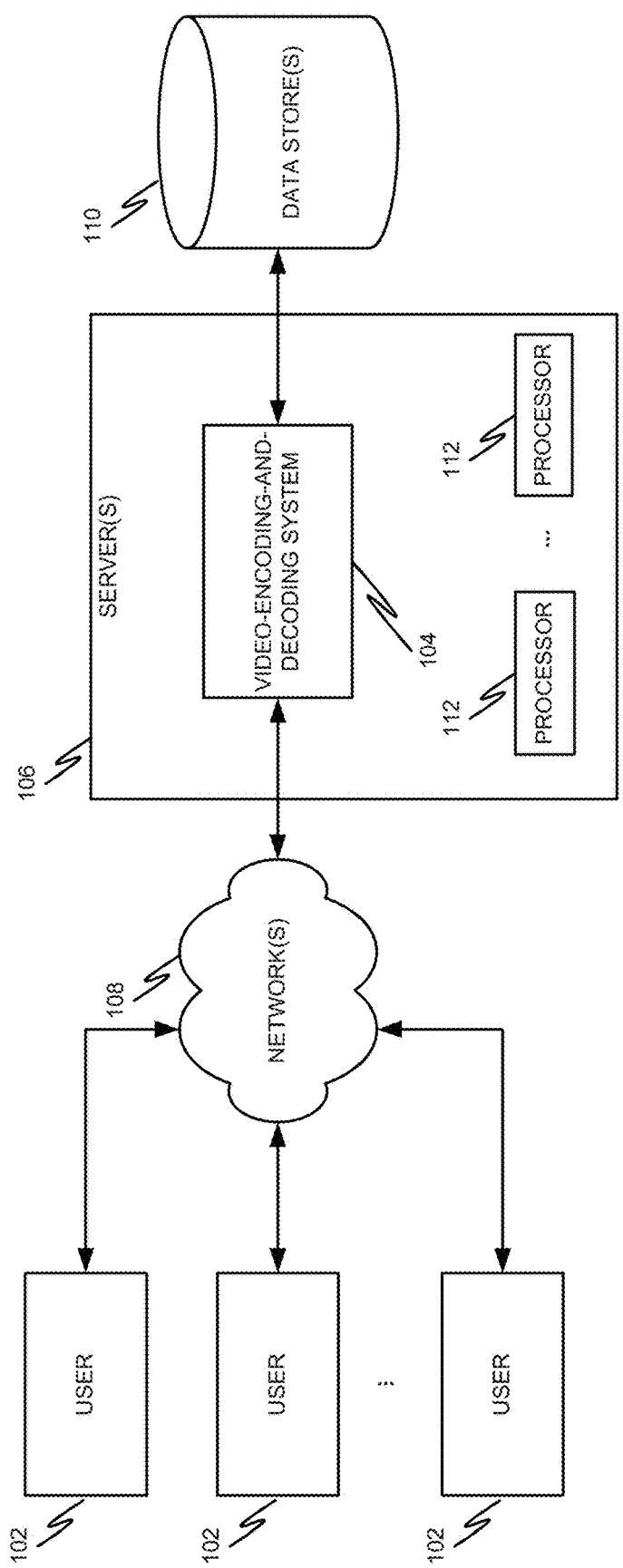
FIG. 2 is an example computer-implemented environment wherein users can interact with a video-encoding-and-decoding system hosted on one or more servers through a network, according to one embodiment of the present invention.

FIG. 2 is an example computer-implemented environment wherein users 102 can interact with a video-encoding-and-decoding system 104 hosted on one or more servers 106 through a network 108, according to one embodiment of the present invention. As shown in FIG. 2, the users 102 can interact with the video-encoding-and-decoding system 104 through a number of ways, such as over one or more networks 108. One or more servers 106 accessible through the network(s) 108 can host the video-encoding-and-decoding system 104. The one or more servers 106 can also contain or have access to one or more data stores 110 for storing data for the video-encoding-and-decoding system 104. The one or more servers 106 implement one or more data processors 110. For example, the data processors 110 can be configured for parallel computing. The video-encoding-and-decoding system 104 can assist the users 102 to implement one or more video encoding and decoding algorithms, e.g., to improve compression efficiency of surveillance videos.

Figure 3:
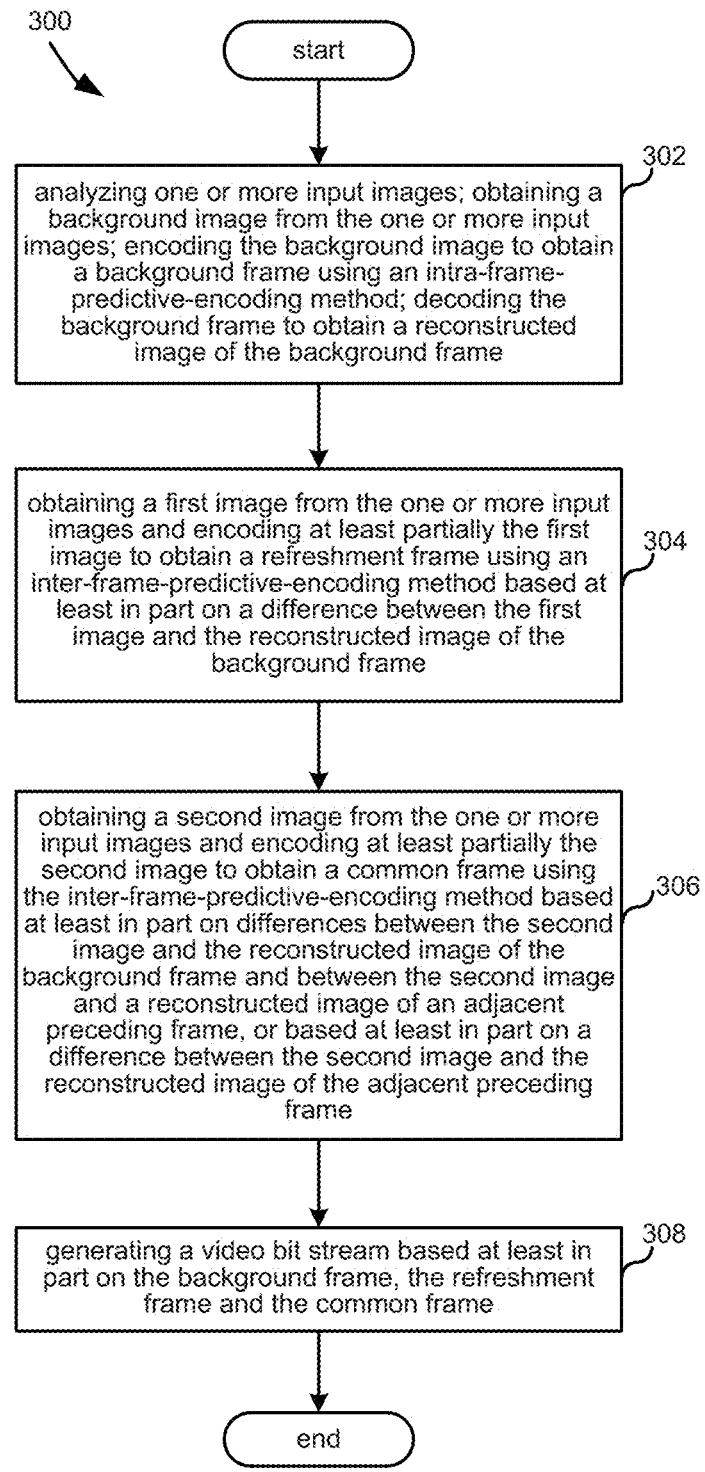
FIG. 3 is an example flow diagram showing a method for video encoding according to one embodiment of the present invention.

FIG. 3 is an example flow diagram showing a method for video encoding according to one embodiment of the present invention. The video encoding method 300 comprises multiple processes.

As shown in FIG. 3, the process 302 includes: analyzing one or more input images; choosing an input image from the input images to serve as a background image; encoding the background image to obtain a background frame using an intra-frame-predictive-encoding method; decoding the encoded background frame to obtain a reconstructed image of the background frame. For example, if the background does not change, the obtained background image remains the same. When the background changes, the obtained background image is updated. In surveillance scenarios, the background generally remains without change for long periods of time, so the time interval between two background frames is very long, for example, 1 minute.

The process 304 includes: obtaining an input image to serve as a first image; encoding at least partially the first image to obtain a refreshment frame using an inter-frame-predictive-encoding method based upon the difference between the first image and the reconstructed image of the background frame.

For example, the input image can be an image collected by a video collection module and processed using an image signal processor (ISP). As another example, the input image can be a decoded image. A reconstructed image may be obtained by decoding an encoded frame according to a decoding algorithm at a decoding end (e.g., a decoding terminal). Due to potential encoding loss, the reconstructed image and the input image (i.e., the original image) can be different to a certain extent. Using the reconstructed image for encoding can prevent error accumulation.

The process 306 includes: obtaining an input image to serve as a second image; encoding at least partially the second image to obtain a common frame using the inter-frame-predictive-encoding method based upon the differences between the second image and the reconstructed image of the background frame and between the second image and the reconstructed image of the adjacent preceding frame, or based upon the difference between the second image and the reconstructed image of the adjacent preceding frame. For example, multiple refreshment frames and common frames based on the refreshment frames are encoded using a same reconstructed image of the background frame. The process 308 includes: generating a video bit stream according to the background frame, the refreshment frames and the common frames.

In some embodiments, as discussed above, the inter-frame-predictive-encoding method can be at least partially adopted for encoding based upon the difference between an input image and a reconstructed image of the background frame, the difference between the input image and a reconstructed image of the background frame, or the difference between the input image and the adjacent previous input image, thereby saving a great amount of encoding bits, compared with encoding only using an intra-frame-predictive-encoding method. For scenes with large amounts of redundant background information, the same level of image quality can be obtained at lower bit rates, so that the video storage costs can be reduced. In addition, the original input image is used as the background image and can be directly displayed to improve compatibility, compared with the conventional technology that implements a virtual image as the background image.

In certain embodiments, further improvements can be adopted. For example, an input image with a lowest foreground confidence degree is used as the background image to better differentiate between the background part and the foreground part. A background image marker can be used to set the corresponding input image as the background image that can be directly displayed.

Particularly, the process 302 comprises the following operations for acquisition of background images: calculating foreground confidence degree information for pixels of multiple consecutive input images; and setting an input image with the lowest foreground confidence degree as the background image. The confidence degree is also known as trustworthiness or confidence level, namely the degree of certainty to which a judgment can be made. The foreground confidence degree shows the degree of confidence regarding whether a current pixel corresponds to a moving target or not. The higher the foreground confidence degree is, the higher the probability that the current pixel corresponds to a real moving target. The lower the foreground confidence degree is, the lower the probability that the current pixel is part of the real background. For example, the foreground confidence degree can be obtained by building a Single Gaussian Model or a Mixture Gaussian Model for each pixel for analysis.

In some embodiments, the foreground confidence degree information can be calculated for each pixel in the consecutive input images to select the background image. In certain embodiments, multiple consecutive input images can be down-sampled first. Then foreground confidence degree information for each pixel from the down-sampled images can be calculated, and the original input image that corresponds to a down-sampled image with the lowest foreground confidence degree can be used as the background image.

For example, a value of a particular pixel can be set as a background pixel value to replace the original background pixel value if the foreground confidence degree of the particular pixel is lower than a specific threshold value. The occurrence probability of pixel values lower than a certain threshold foreground confidence degree within a time interval can be calculated, and the pixel value with the highest probability of occurrence can be set as the background pixel value. Weighted averaging of pixels with foreground confidence degrees lower than a certain threshold from a time interval may be conducted to obtain a final background pixel value. The background image is obtained by combining the background pixel values obtained from the above-noted methods. As an example, the 'foreground confidence degree' is a concept through which the foreground and background can be differentiated. In other embodiments, other methods, not limited to using foreground confidence degrees, may be used to obtain the background image.

In some embodiments, calculating foreground confidence degree information for pixels of the consecutive input images comprises the following operations: outputting a background image marker based upon the foreground confidence degree information of the consecutive input images, wherein the background image marker is used in designating the corresponding input image as a background image. In certain embodiments, "encoding the background image to obtain a background frame using an intra-frame-predictive-encoding method" in the process 302 comprises the following operations: taking an input image corresponding to the output background image marker as the background image so as to encode the background image to obtain the background frame using an intra-frame-predictive-encoding method. In other embodiments, other methods, not limited to using the background image marker, can be used to select an input image to serve as the background image.

In certain embodiments, further improvements to encoding can be adopted. For example, input images can be partitioned into foreground portions and background portions. The foreground portions can be encoded using an intra-frame-predictive-encoding method, and the background portions can be encoded using an inter-frame-predictive-encoding method with the obtained reconstructed image of the background frame as a reference image. Thus, a large amount of bits that may be needed during encoding of the background portions can be saved, compared with the conventional technology of using an intra-frame-predictive-encoding method for the entire frame. Error accumulation and spread caused by predictive quantization may be reduced/prevented. Encoding efficiency and error control may be better balanced. As an example, unlike the conventional P Frame encoding methods, common frames may be encoded by using a reconstructed image of the background frame as the reference image, so as to obtain better matching blocks during encoding. Thus, encoding bits may be saved and encoding quality may be improved. For example, combined foreground confidence degrees may be suitable for determining an encoding method for refreshment frames and common frames.

Particularly, the process 304 comprises the following operations: obtaining a foreground confidence degree for each pixel in a first image; partitioning the first image into a first foreground portion and a first background portion through comparison between the foreground confidence degrees and a threshold value; encoding the first foreground portion according to an intra-frame-predictive-encoding method; and encoding the first background portion according to an inter-frame-predictive-encoding method with the reconstructed image of the background frame as a reference image.

As discussed above, the foreground portions can be encoded using an intra-frame-predictive-encoding method, and the background portions can be encoded using an inter-frame-predictive-encoding method with the obtained reconstructed image of the background frame as a reference image to save a large amount of bits that may be needed during encoding of the background portions, compared with the conventional technology of using an intra-frame-predictive-encoding method for the entire frame. Error accumulation and spread caused by predictive quantization may be reduced/prevented. Encoding efficiency and error control may be better balanced.

The process 306 comprises the following operations: obtaining a foreground confidence degree of each pixel in a second image; partitioning the second image into a second foreground portion and a second background portion based upon the comparison between the foreground confidence degrees and the threshold value; encoding at least part of the second foreground portion according to an inter-frame-predictive-encoding method with a reconstructed image of an adjacent preceding frame as a reference image; and encoding the second background portion according to an inter-frame-predictive-encoding method with the reconstructed image of the background frame and/or the reconstructed image of the adjacent preceding frame as reference images.

The second background portion may use, as a reference, the reconstructed image of the adjacent preceding frame or the reconstructed image of the background frame. For example, the newly exposed background portion uses the reconstructed image of the background frame as a reference, and other background portions may use the reconstructed image of the adjacent preceding frame as a reference.

As an example, unlike the conventional P Frame encoding methods, common frames may be encoded by using a reconstructed image of the background frame as the reference image, so as to obtain better matching blocks during encoding. Thus, encoding bits may be saved and encoding quality may be improved. For example, combined foreground confidence degrees may be suitable for determining an encoding method for refreshment frames and common frames.

As an example, the second foreground portion can be encoded entirely according to an inter-frame-predictive-encoding method with the reconstructed image of the adjacent preceding frame as a reference image. As another example, part of the second foreground portion can be encoded according to an inter-frame-predictive-encoding method with the reconstructed image of the adjacent preceding frame as a reference image, and other part of the second foreground portion can be encoded according to an intra-frame-predictive-encoding method.

In one embodiment, two frames are used as references: one frame is the adjacent preceding frame, and the other frame is the background frame. In another embodiment, only the adjacent preceding frame is used as the reference frame to achieve balance between complexity and compression efficiency (e.g., due to certain platform limitations).

In certain embodiments, after the aforesaid acquisition of the foreground confidence degree of each pixel, the foreground confidence degrees of pixels can be combined. For example, the combining process can be accomplished according to the following operations: performing averaging of foreground confidence degrees of multiple pixels within an input image block and setting the average value as the foreground confidence degree of the input image block; setting a foreground confidence degree with the highest occurrence probability in the input image block as the foreground confidence degree for the block; or calculating a foreground confidence degree for each pixel in a compressed input image and setting the foreground confidence degree of each pixel as the foreground confidence degree for the corresponding block of the input image before compression.

Figure 4:
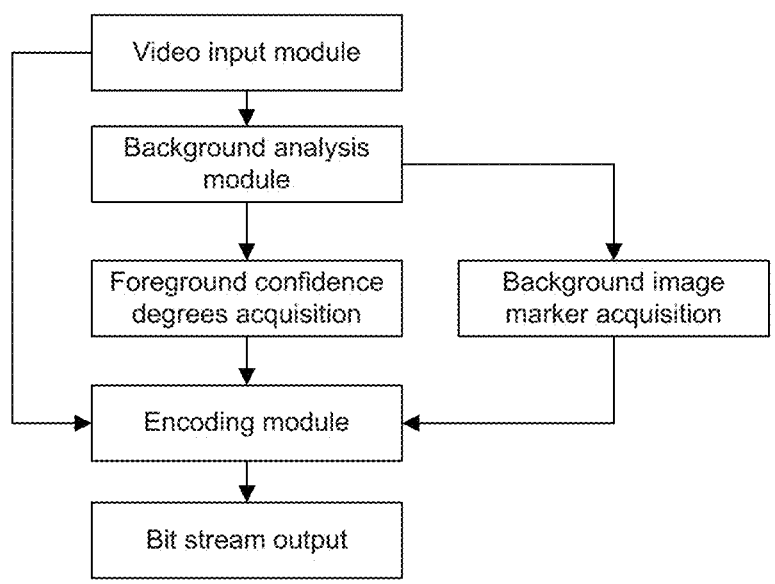
FIG. 4 is an example diagram showing video encoding according to one embodiment of the present invention.

FIG. 4 is an example diagram showing a video encoding according to one embodiment of the present invention. As shown in FIG. 4, a video input module provides an original input image to a background analysis module and an encoding module. For example, the original input image can be an image which is collected by a video collection module and processed with ISP processing. In another example, the original input image can be a decoded image.

The background analysis module conducts analysis on each input image frame to obtain a foreground confidence degree of each pixel in the current image. The higher the foreground confidence degree is, the higher the possibility that a pixel corresponds to a real moving target. The lower the foreground confidence degree is, the higher the probability that a pixel corresponds to part of a real background. Moreover, through analysis of multiple consecutive images, an original image having a relatively low foreground confidence degree can be obtained to serve as the background image. For example, the foreground confidence degree can be obtained by building a Single Gaussian Model or a Mixed Gaussian Model of each pixel for analysis.

The foreground confidence degree for each pixel output by the background analysis module is obtained, and appropriate combination is performed to facilitate encoding. In one embodiment, during combination, the foreground confidence degrees within a 16*16 block are compiled and averaged, and the average value serves as the foreground confidence degree of the block. In another embodiment, the foreground confidence degree with the highest probability of occurrence within the 16*16 block serves as the foreground confidence degree of the block. In yet another embodiment, an input image is compressed, and background analysis is conducted on the compressed image to obtain a foreground confidence degree for each pixel in the compressed image. The foreground confidence degrees for the pixels are set to correspond to foreground confidence degrees of one or more input image blocks. For example, if the image resolution for an input image is 1600*1200, and the input image is compressed to 200*150 for background analysis. The foreground confidence degree for each pixel in the 200*150 image is obtained, and one or more foreground confidence degrees for the 8*8 blocks in the 1600*1200 image that geometrically correspond to the pixel can be obtained. Any suitable compression method may be implemented for input image compression. As an example, the combined foreground confidence degree suitable for encoding is used as a reference for encoding refreshment frames and common frames.

A background image marker output by the background analysis module may be used as input of the encoding module, and an image corresponding to the background image marker can be designated as the background image. The encoding module encodes each input original image, and outputs different types of bit streams.

Figure 5:
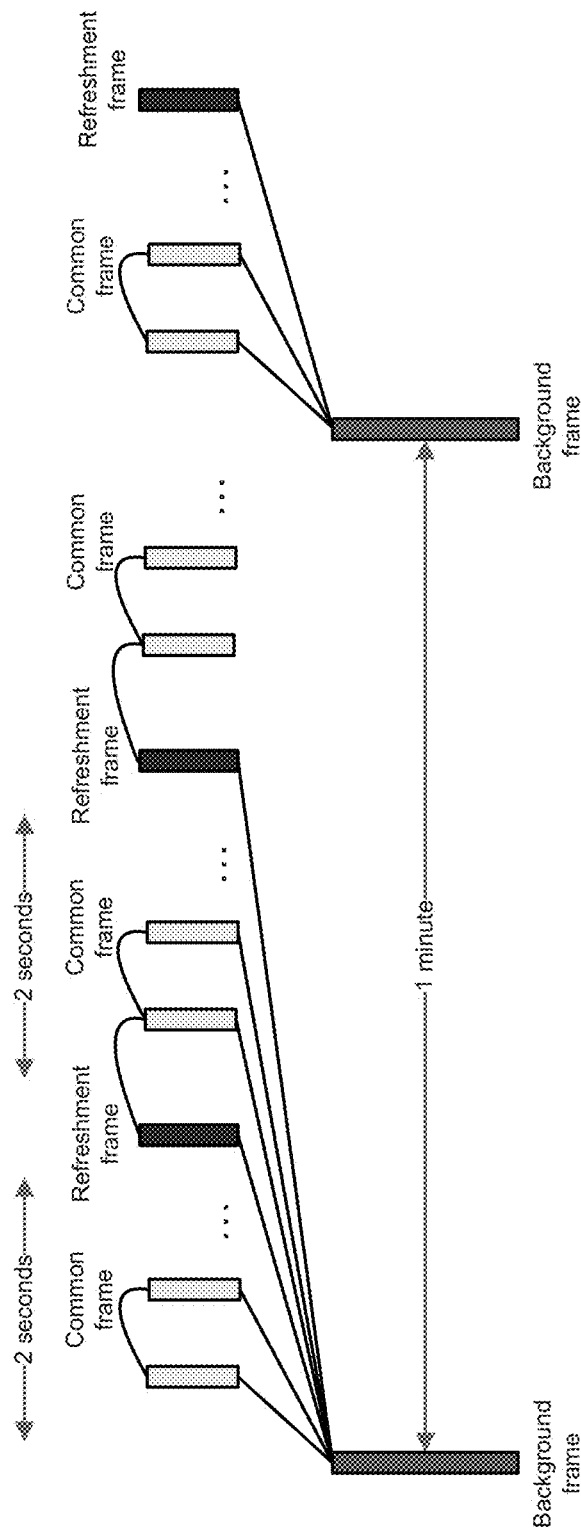
FIG. 5 and FIG. 6 are example diagrams showing certain encoding results according to some embodiments of the present invention.
Figure 6:
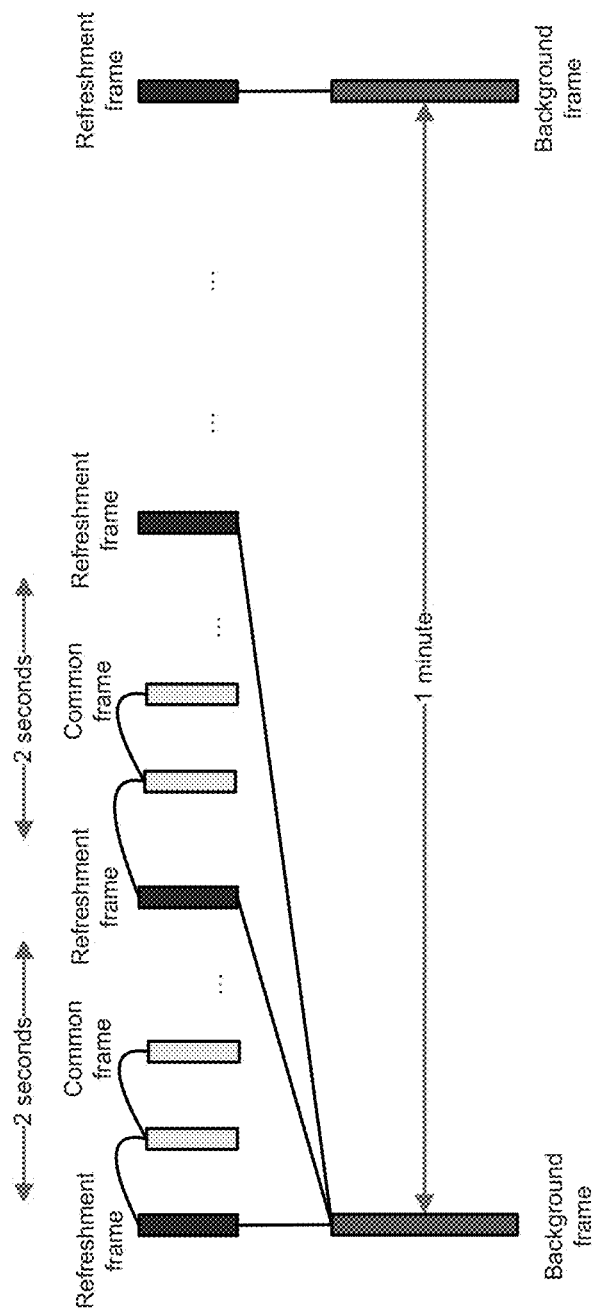

FIG. 5 and FIG. 6 are example diagrams showing certain encoding results according to some embodiments of the present invention. As shown in FIG. 5 and FIG. 6, only when the background changes, the obtained background image is updated. Thus, the corresponding background inter-frame interval is very long, and refreshment frames are updated once every 2 seconds. The difference between FIG. 5 and FIG. 6 is that reference frames of the common frames (i.e., reconstructed images of the reference frames) are different.

Particularly, as shown in FIG. 5, each refreshment frame uses a background frame as a reference frame (e.g., an arrow from the refreshment frame pointing to the background frame). A first common frame after the refreshment frame uses the refreshment frame and the background frame for reference, while other common frames after the refreshment frame use the adjacent preceding frame and the background frame for reference. As shown in FIG. 6, each refreshment frame only uses a background frame as a reference frame. A first common frame after the refreshment frame as well as other common frames only use the adjacent preceding frame for reference.

Different encoding-frame bit streams may be output at different times. For example, as shown in FIG. 5 and FIG. 6, a background-frame bit stream is output every 1 minute, a refreshment frame bit stream is output every 2 seconds, while common-frame bit streams are output during other times.

Figure 7:
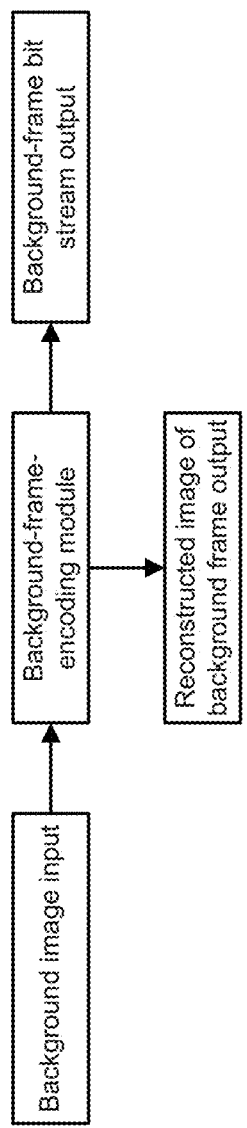
FIG. 7 is an example diagram showing background frame encoding according to one embodiment of the present invention.

FIG. 7 is an example diagram showing background frame encoding according to one embodiment of the present invention. As shown in FIG. 7, input background images are input to a background-frame encoding module which outputs background-frame bit streams and background-frame reconstructed images. Background frames only use an I Frame method for encoding. Background frames are updated only when the background changes, and do not need to be updated under normal circumstances. In surveillance settings, backgrounds generally remain without change for long periods of time, so the time interval between two background frames is very long. As shown in FIG. 5 and FIG. 6, the time interval between two background frames is 1 minute. The time interval between background frames may be adjusted according to background changes. For example, if the background does not change frequently, the time interval between background frames can be set to be even longer (e.g., 10 minutes).

Figure 8:
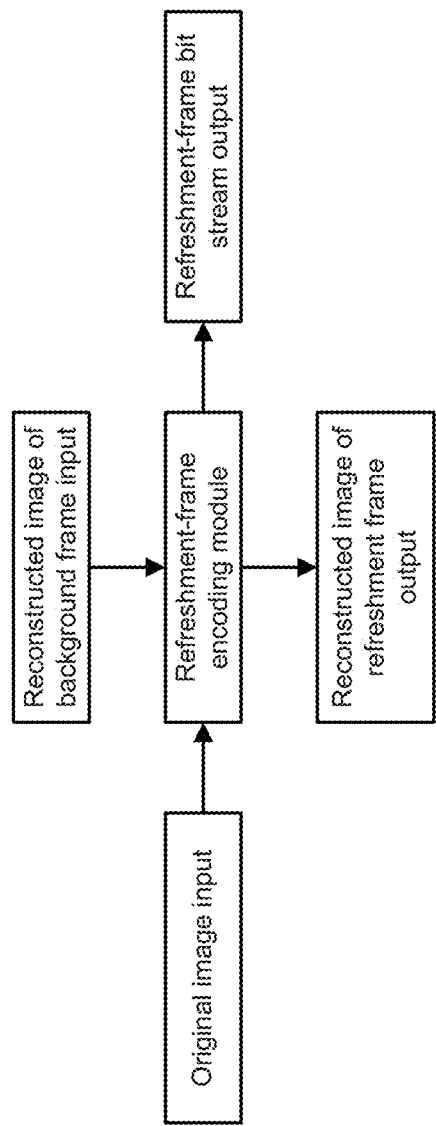
FIG. 8 is an example diagram showing refreshment frame encoding according to one embodiment of the present invention.

FIG. 8 is an example diagram showing refreshment frame encoding according to one embodiment of the present invention. As shown in FIG. 8, input of a refreshment-frame encoding module includes an original image and reconstructed images of background frames, and output of the refreshment-frame encoding module includes reconstructed images of refreshment frames and refreshment-frame-encoding bit streams. Refreshment frame encoding only uses the reconstructed images of the background frames for reference. As shown in FIG. 5, refreshment frames only use the background frames for reference.

In addition, the foreground confidence degree information output by the background analysis module is combined, and then used for mode selection of refreshment frame encoding. For example, the lower the foreground confidence degree is, the higher the possibility that a matching block can be obtained from the background frame. The higher the foreground confidence degree is, the higher the possibility that a matching block can be obtained according to intra-frame prediction. The time interval between two refreshment frames is relatively short, for example, 1 second or 2 seconds. Based upon the above-noted mode selection principle, under normal circumstances, a foreground portion of a refreshment frame may be encoded using the I Frame encoding method, and a background portion of the refreshment frame may be encoded using the P Frame encoding method. Compared with the conventional encoding method of using the I Frame encoding method for the entire frame, a large amount of encoding bits can be saved. For example, if the foreground ratio for a frame is 10%, encoding bits using the above-noted refreshment frame encoding method can be reduced to about 10% of that of the conventional method.

In addition, as blocks having high foreground confidence degrees in refreshment frames tend to be encoded with an intra-frame-predictive-encoding method, error accumulation and spread caused by predictive quantization can be reduced/prevented so that original functions of I Frames can be achieved.

Figure 9:
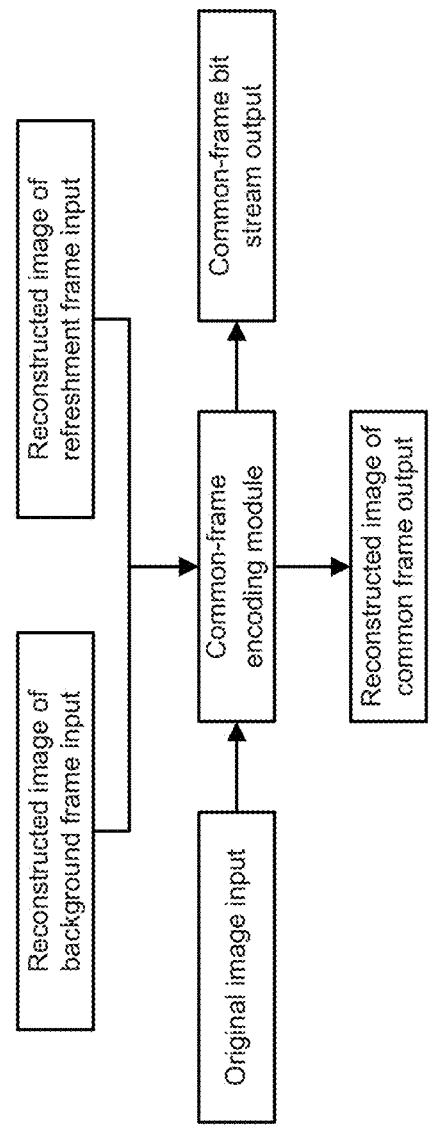
FIG. 9 and FIG. 10 are example diagrams showing common frame encoding according to some embodiments of the present invention.
Figure 10:
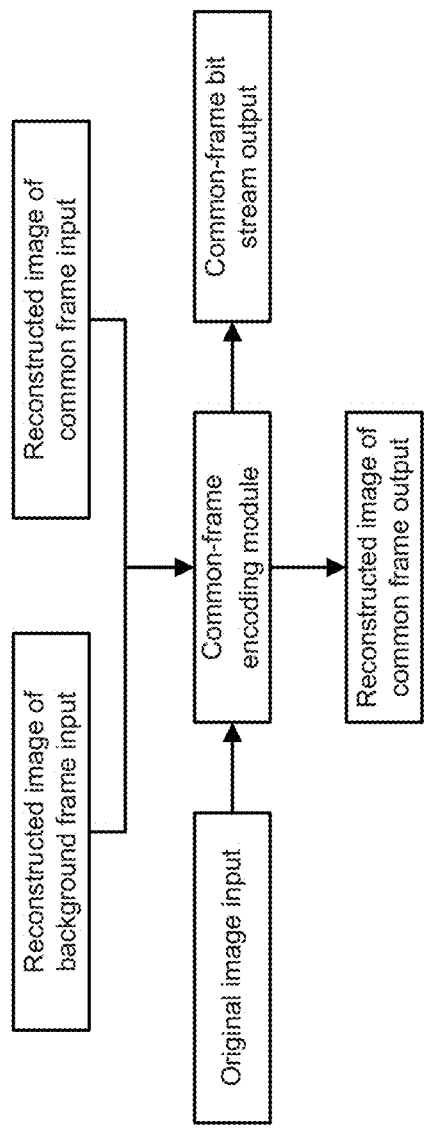

FIG. 9 and FIG. 10 are example diagrams showing common frame encoding according to some embodiments of the present invention. As shown in FIG. 9, for a first common frame after a refreshment frame, an original image, a reconstructed image of a background frame, and a reconstructed image of a refreshment frame are input into a common-frame-encoding module that outputs a reconstructed image of the first common frame and a common-frame bit stream. As shown in FIG. 10, for a particular common frame other than the first common frame after the refreshment frame, an original image, a reconstructed image of the background frame, and a reconstructed image of another common frame are input into the common-frame-encoding module that outputs a reconstructed image of the particular common frame and a common-frame bit stream.

In some embodiments, common frames use the P Frame method for encoding. For example, the first common frame after the refreshment frame uses the reconstructed image of the background frame and the reconstructed image of the refreshment frame for reference. Other common frames can use the reconstructed image of the background frame and the reconstructed image of a preceding common frame for reference. As shown in FIG. 5, a common frame uses the background frame and the refreshment frame, or another common frame for reference.

In addition, the foreground confidence degree information output by the background analysis module is combined, and then used for mode selection of refreshment frame encoding. For example, the lower the foreground confidence degree is, the higher the possibility that a matching block can be obtained from the background frame. The higher the foreground confidence degree is, the higher the possibility that a matching block can be obtained from the preceding frame.

In certain embodiments, one extra reference frame is added for common frame encoding, compared with the conventional P Frame encoding method. Background information at different times in the overall image sequence is obtained for reference, so that a better matching block can be obtained during encoding. Particularly for newly exposed backgrounds appearing due to moving objects, a large number of encoding bits can be saved, and the encoding quality can be better.

Figure 11:
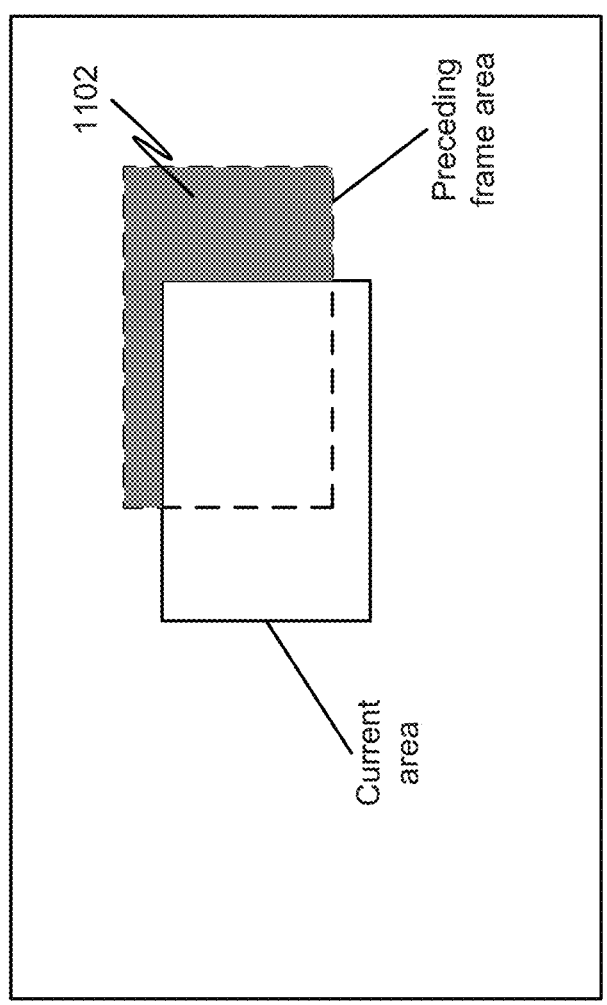
FIG. 11 is an example diagram showing comparison of input images at different times according to one embodiment of the present invention.

FIG. 11 is an example diagram showing comparison of input images at different times according to one embodiment of the present invention. As shown in FIG. 11, a gray portion 1102 corresponds to a newly exposed background portion of a current input image compared with the image at a previous moment. In one embodiment, if only a preceding frame is used for reference, a suitable matching block may not be found as the background portion of the preceding frame is blocked by an object. Thus, only an intra-frame-predictive-encoding method can be used for encoding. If the mode selection principle described above is adopted, a matching block for the portion of the background can be found in the background frame, and an inter-frame-predictive-encoding method can be used for encoding, to save encoding bits and improve encoding quality.

In specific embodiments, two reference frames may be used for common frame encoding, where a first reference frame is a preceding frame, and a second reference frame is a background frame. In other embodiments, due to certain platform limitations, only the preceding frame is used as a reference frame, so as to provide balance between complexity and compression efficiency.

Figure 12:
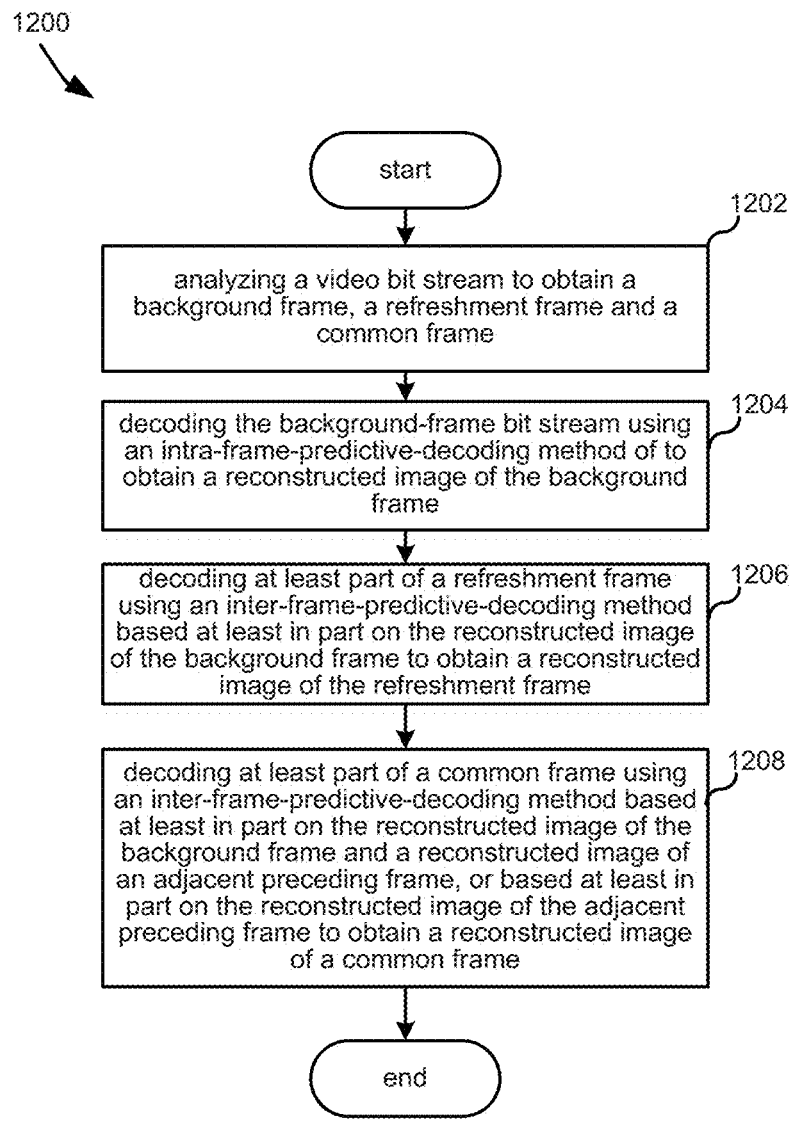
FIG. 12 is an example flow diagram showing a method of video decoding according to one embodiment of the present invention.

FIG. 12 is an example flow diagram showing a method of video decoding according to one embodiment of the present invention. As shown in FIG. 12, the video decoding method 1200 comprises multiple processes.

For example, the process 1202 includes: analyzing (e.g., parsing) an obtained video bit stream to obtain a background frame, one or more refreshment frames and one or more common frames. The process 1204 includes: decoding the background-frame bit stream using an intra-frame-predictive-decoding method to obtain a reconstructed image of the background frame for output display. The process 1206 includes: decoding at least part of a refreshment frame using an inter-frame-predictive-decoding method based upon the reconstructed image of the background frame to obtain a reconstructed image of a refreshment frame for output display. The process 1208 includes: decoding at least part of a common frame using an inter-frame-predictive-decoding method, based on the reconstructed image of the background frame and the reconstructed image of the adjacent preceding frame, or based on only the reconstructed image of the adjacent preceding frame, so as to obtain a reconstructed image of a common frame for output display.

As an example, a background frame corresponds to a video frame obtained by encoding a background image using an intra-frame-predictive-encoding method. A refreshment frame corresponds to a video frame obtained by encoding an input image at least partially using an inter-frame-predictive-encoding method based upon the difference between the input image and the reconstructed image of the background frame. A common frame corresponds to a video frame obtained by encoding an input image at least partially using an inter-frame-predictive-encoding method based upon the differences between the input image and the reconstructed image of the background frame and between the input image and the reconstructed image of the adjacent preceding frame. In certain embodiments, for random access, a background frame can be decoded first, and then one or more refreshment frames can be decoded. Subsequently, one or more common frames can be decoded sequentially to obtain an image that is to be accessed. Thus, a quick response can be achieved for random location.

Figure 13:
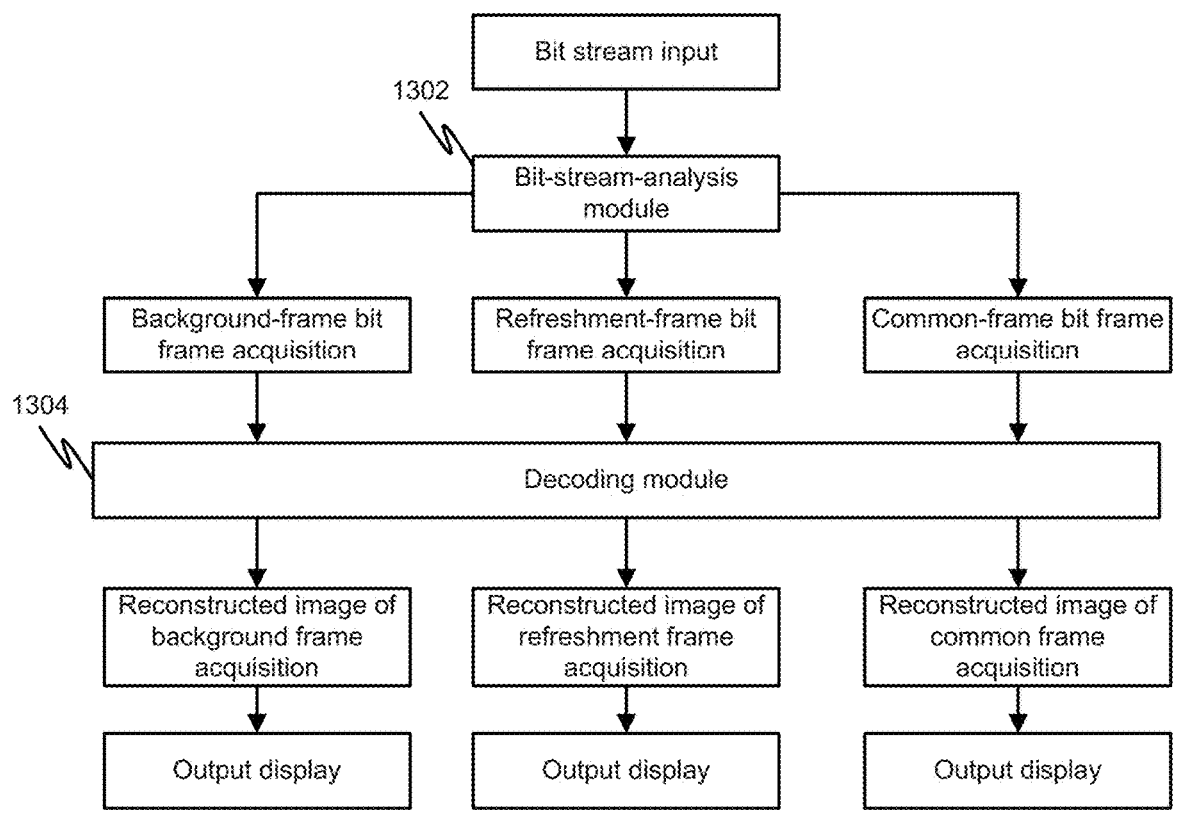
FIG. 13 is an example flow diagram for a decoder according to one embodiment of the present invention.

FIG. 13 is an example flow diagram for a decoder according to one embodiment of the present invention. As shown in FIG. 13, a bit-stream analysis module 1302 in a decoder receives and analyzes (e.g., parses) one or more input bit streams, and provides a background-frame bit stream, a refreshment-frame bit stream and/or a common-frame bit stream. The decoding module 1304 receives the background-frame bit stream, the refreshment-frame bit stream and/or the common-frame bit stream and outputs background-frame reconstructed images, refreshment-frame reconstructed images and/or common-frame reconstructed images, respectively, for output display.

Figure 14:
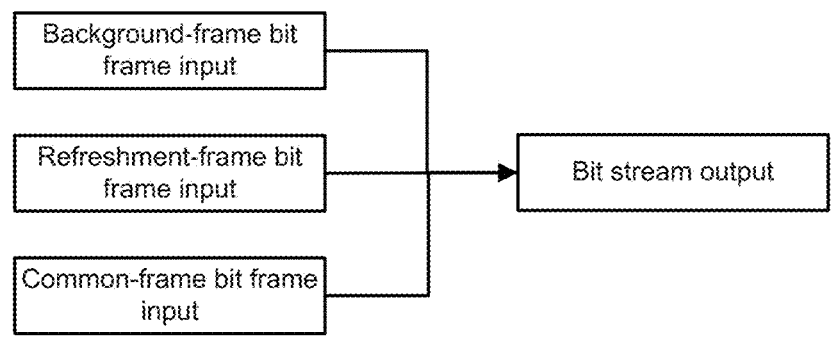
FIG. 14 is an example flow diagram for a bit-stream analysis module according to one embodiment of the present invention.

FIG. 14 is an example flow diagram for the bit-stream analysis module 1302 according to one embodiment of the present invention. As shown in FIG. 14, the bit stream analysis module 1302 inputs the background-frame bit stream, the refreshment-frame bit stream and/or the common-frame bit stream and provides these bit streams to the decoding module 1304.

Figure 15:
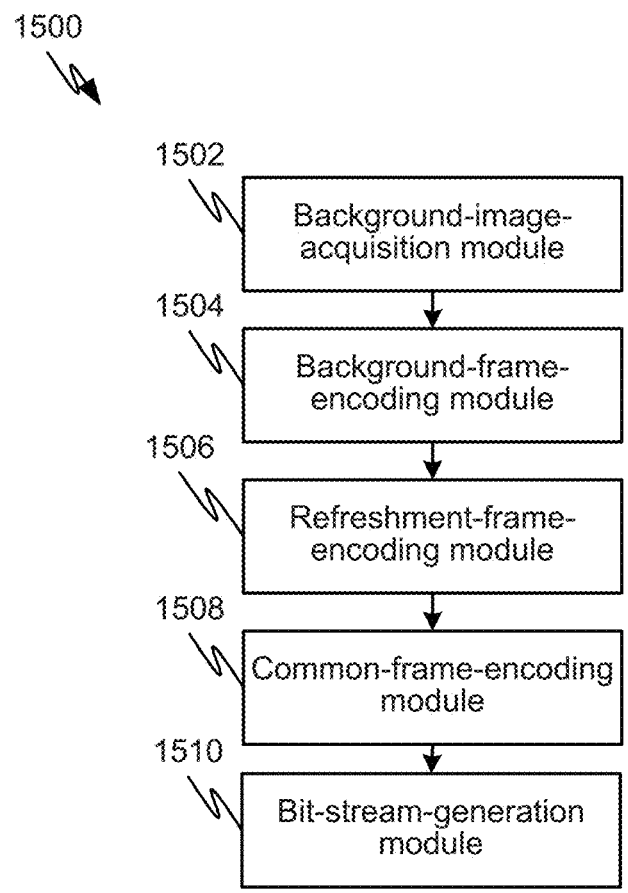
FIG. 15 is an example diagram for a video encoding device according to one embodiment of the present invention.

FIG. 15 is an example diagram for a video encoding device according to one embodiment of the present invention. As shown in FIG. 15, a video encoding device 1500 comprises multiple modules.

For example, a background-image-acquisition module 1502 is operable for analyzing one or more input images and choosing an input image from the input images to serve as a background image. A background-frame-encoding module 1504 is operable for encoding the background image to obtain a background frame using an intra-frame-predictive-encoding method and decoding the encoded background frame to obtain a reconstructed image of the background frame. A refreshment-frame-encoding module 1506 is operable for obtaining an input image to serve as a first image and encoding at least partially the first image to obtain a refreshment frame using an inter-frame-predictive-encoding method based upon the difference between the first image and the reconstructed image of the background frame. A common-frame-encoding module 1508 is operable for obtaining an input image to serve as a second image; encoding at least partially the second image to obtain a common frame using the inter-frame-predictive-encoding method based upon the differences between the second image and the reconstructed image of the background frame and between the second image and the reconstructed image of the adjacent preceding frame, or based upon the difference between the second image and the reconstructed image of the adjacent preceding frame. A bit-stream-generation module 1510 is operable for generating a video bit stream according to the background frame, the refreshment frames and the common frames.

In some embodiments, multiple refreshment frames and common frames based on the refreshment frames can use a same reconstructed image of the background frame for encoding. For example, a reconstructed image is obtained by decoding an encoded frame according to a decoding algorithm at a decoding end (e.g., a decoding terminal). As the encoding process can result in certain detail loss, the reconstructed image and the input image (i.e., the original image) can be different to a certain extent. Using the reconstructed image for encoding can avoid error accumulation.

In certain embodiments, as discussed above, the inter-frame-predictive-encoding method can be at least partially adopted for encoding based upon the difference between an input image and a reconstructed image of the background frame, the difference between the input image and a reconstructed image of the background frame, or the difference between the input image and the adjacent previous input image, thereby saving a great amount of encoding bits, compared with encoding only using an intra-frame-predictive-encoding method. For scenes with large amounts of redundant background information, the same level of image quality can be obtained at lower bit rates, so that the video storage costs can be reduced. In addition, the original input image is used as the background image and can be directly displayed to improve compatibility, compared with the conventional technology that implements a virtual image as the background image. In specific embodiments, the video encoding device 1500 implements the method 300 as shown in FIG. 3.

In certain embodiments, further improvements can be adopted. For example, an input image with a lowest foreground confidence degree is used as the background image to better differentiate between the background part and the foreground part. A background image marker can be used to set the corresponding input image as the background image that can be directly displayed.

Particularly, the background-image-acquisition module 1502 comprises the following sub-modules: a background-analysis sub-module operable for calculating foreground confidence degree information for pixels of multiple consecutive input images; and a background-acquisition sub-module operable for setting an input image with the lowest foreground confidence degree as the background image.

For example, the background-analysis sub-module includes a background-image-marker-output unit operable for outputting a background image marker based upon the foreground confidence degree information of the consecutive input images, wherein the background image marker is used in designating the corresponding input image as a background image. In certain embodiments, the background-frame-encoding module 1504 is operable for taking an input image corresponding to the output background image marker as the background image so as to encode the background image to obtain the background frame using an intra-frame-predictive-encoding method.

In certain embodiments, further improvements to encoding can be adopted. For example, input images can be partitioned into foreground portions and background portions. The foreground portions can be encoded using an intra-frame-predictive-encoding method, and the background portions can be encoded using an inter-frame-predictive-encoding method with the obtained reconstructed image of the background frame as a reference image. Thus, a large amount of bits that may be needed during encoding of the background portions can be saved, compared with the conventional technology of using an intra-frame-predictive-encoding method for the entire frame. Error accumulation and spread caused by predictive quantization may be reduced/prevented. Encoding efficiency and error control may be better balanced. As an example, unlike the conventional P Frame encoding methods, common frames may be encoded by using a reconstructed image of the background frame as the reference image, so as to obtain better matching blocks during encoding. Thus, encoding bits may be saved and encoding quality may be improved.

Particularly, the refreshment-frame-encoding module 1506 comprises: a first foreground-confidence-degree-acquisition sub-module operable for obtaining a foreground confidence degree for each pixel in a first image; a first image-partitioning sub-module operable for partitioning the first image into a first foreground portion and a first background portion through comparison between the foreground confidence degrees and a threshold value; and a refreshment-frame-encoding sub-module operable for encoding the first foreground portion according to an intra-frame-predictive-encoding method and encoding the first background portion according to an inter-frame-predictive-encoding method with the reconstructed image of the background frame as a reference image.

For example, the common-frame-encoding module 1508 comprises: a second foreground-confidence-degree-acquisition sub-module operable for obtaining a foreground confidence degree of each pixel in a second image; a second image-partitioning sub-module operable for partitioning the second image into a second foreground portion and a second background portion based upon the comparison between the foreground confidence degrees and the threshold value; and a common-frame-encoding sub-module operable for encoding at least part of the second foreground portion according to an inter-frame-predictive-encoding method with a reconstructed image of an adjacent preceding frame as a reference image and encoding the second background portion according to an inter-frame-predictive-encoding method with the reconstructed image of the background frame and/or the reconstructed image of the adjacent preceding frame as reference images.

In certain embodiments, the video decoding device 1500 includes a confidence-degree-combination module operable for combining foreground confidence degrees of pixels. For example, the confidence-degree-combination module performs the combining process according to the following operations: performing averaging of foreground confidence degrees of multiple pixels within an input image block and setting the average value as the foreground confidence degree of the input image block; setting a foreground confidence degree with the highest occurrence probability in the input image block as the foreground confidence degree for the block; or calculating a foreground confidence degree for each pixel in a compressed input image and setting the foreground confidence degree of each pixel as the foreground confidence degree for the corresponding block of the input image before compression.

Figure 16:
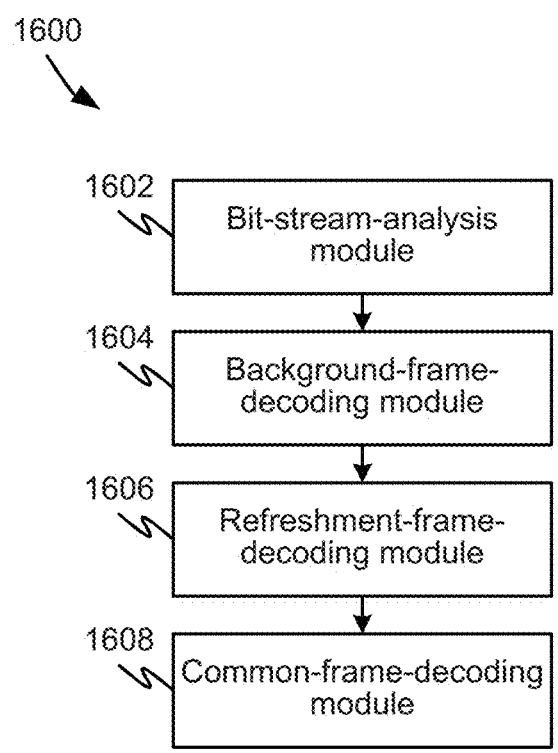
FIG. 16 is an example diagram for a video decoding device according to one embodiment of the present invention.

FIG. 16 is an example diagram for a video decoding device according to one embodiment of the present invention. As shown in FIG. 16, a video decoding device 1600 comprises multiple modules.

For example, a bit-stream-analysis module 1602 is operable for analyzing (e.g., parsing) an obtained video bit stream to obtain a background frame, one or more refreshment frames and one or more common frames. A background-frame-decoding module 1604 is operable for performing intra-frame-prediction decoding of the background-frame bit stream to obtain a reconstructed image of the background frame for output display. A refreshment-frame-decoding module 1606 is operable for performing inter-frame-prediction decoding on at least part of a refreshment frame based upon the reconstructed image of the background frame to obtain a reconstructed image of the refreshment frame for output display. A common-frame-decoding module 1608 is operable for performing intra-frame-prediction decoding on at least part of a common frame, based on the reconstructed image of the background frame and the reconstructed image of the adjacent preceding frame, or based on only the reconstructed image of the adjacent preceding frame, so as to obtain a reconstructed image of the common frame for output display.

As an example, a background frame corresponds to a video frame obtained by encoding a background image using an intra-frame-predictive-encoding method. A refreshment frame corresponds to a video frame obtained by encoding an input image at least partially using an inter-frame-predictive-encoding method based upon the difference between the input image and the reconstructed image of the background frame. A common frame corresponds to a video frame obtained by encoding an input image at least partially using an inter-frame-predictive-encoding method based upon the differences between the input image and the reconstructed image of the background frame and between the input image and the reconstructed image of the adjacent preceding frame. In certain embodiments, for random access, a background frame can be decoded first, and then one or more refreshment frames can be decoded. Subsequently, one or more common frames can be decoded sequentially to obtain an image that is to be accessed. Thus, a quick response can be achieved for random location. In specific embodiments, the video decoding device 1600 implements the method 1200 as shown in FIG. 12.

In some embodiments, the systems, devices and/or methods described herein can be configured for obtaining and encoding background frames, refreshment frames and common frames. For example, the systems, devices and/or methods described herein can be configured for encoding the refreshment frames by taking only a background frame as a reference, and encoding common frames by taking the background frame and a preceding frame as references. As an example, the systems, devices and/or methods described herein can be configured for encoding refreshment frames and common frames based upon a foreground confidence degree. As another example, the systems, devices and/or methods described herein can be configured for ensuring that the higher the foreground confidence degree for encoded blocks in refreshment frames and common frames, the higher the possibility that the refreshment frames and the common frames can be updated faster.

In certain embodiments, the systems, devices and/or methods described herein can be configured for analyzing, obtaining and encoding a background frame, wherein a foreground confidence degree of the background frame is relatively low, so that better matching blocks can be found more easily by adding one encoding reference frame for frames for a P Frame encoding method to lower the encoding bit rate. In specific embodiments, the systems, devices and/or methods described herein can be configured for encoding one or more refreshment frames, wherein the refreshment frames only use the background frame as a reference so as to balance encoding efficiency and random access. The lower the foreground confidence degrees of the blocks in refreshment frames are, the higher the possibility that a matching block can be obtained from the background frame. The higher the foreground confidence degrees of the blocks in refreshment frames are, the higher the possibility that a matching block can be obtained from intra-frame prediction. Thus, a large amount of encoding bits can be saved, compared with that of an encoding method only using an I Frame method. Moreover, for random access, a background frame can be decoded first, and then one or more refreshment frames can be decoded. Subsequently, one or more common frames can be decoded sequentially to obtain an image that is to be accessed. Decoding costs of one frame may be added, compared with conventional decoding methods.

Figure 17:
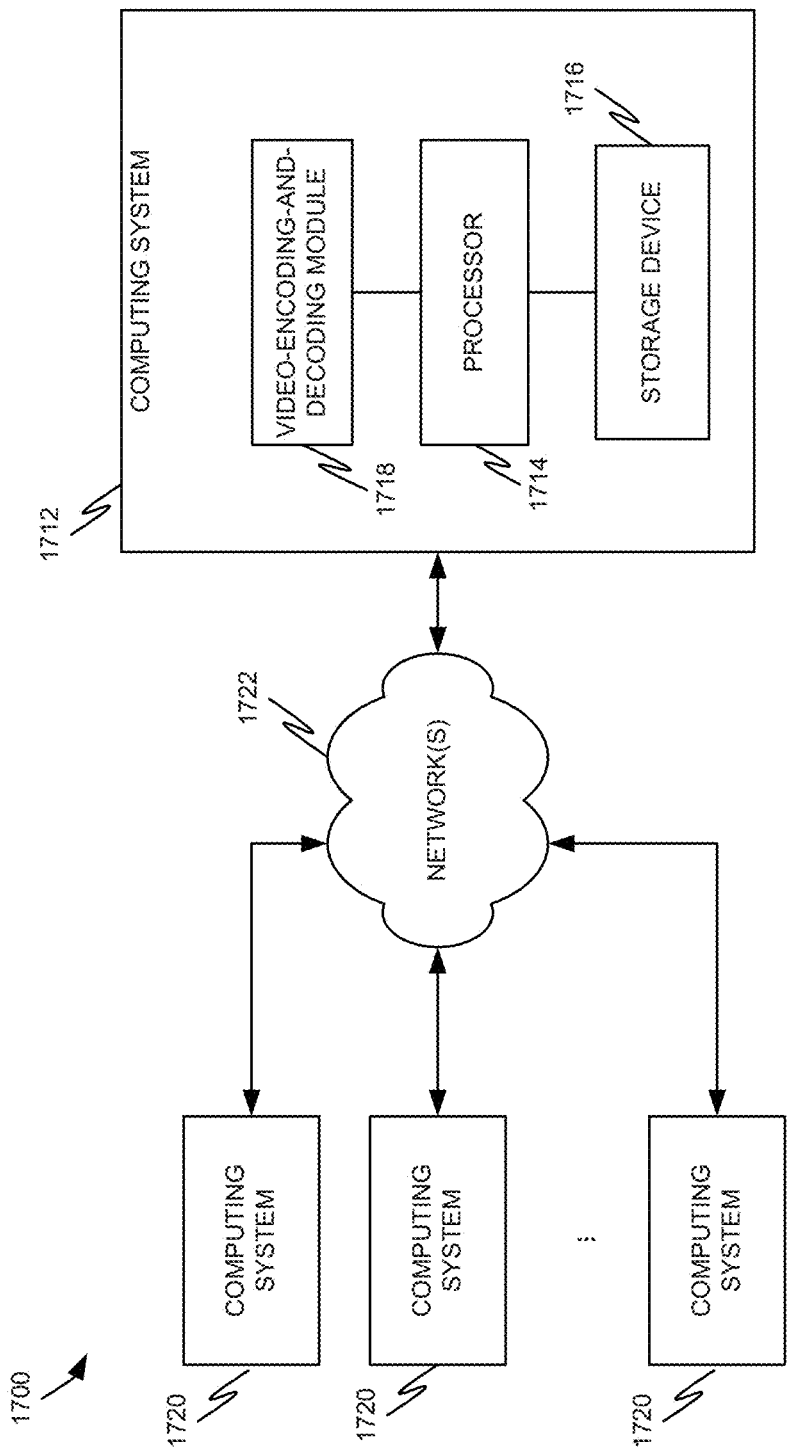
FIG. 17 is an example diagram for a system for video encoding and decoding according to one embodiment of the present invention.

FIG. 17 is an example diagram for a system for video encoding and decoding according to one embodiment of the present invention. As shown in FIG. 17, the system 1700 includes a computing system 1712 which contains a processor 1714, a storage device 1716 and a video-encoding-and-decoding module 1718. The computing system 1712 includes any suitable type of computing device (e.g., a server, a desktop, a laptop, a tablet, a mobile phone, etc.) that includes the processor 1714 or provide access to a processor via a network or as part of a cloud based application. The video-encoding-and-decoding module 1718 includes tasks and is implemented as part of a user interface module (not shown in FIG. 17).

Figure 18:
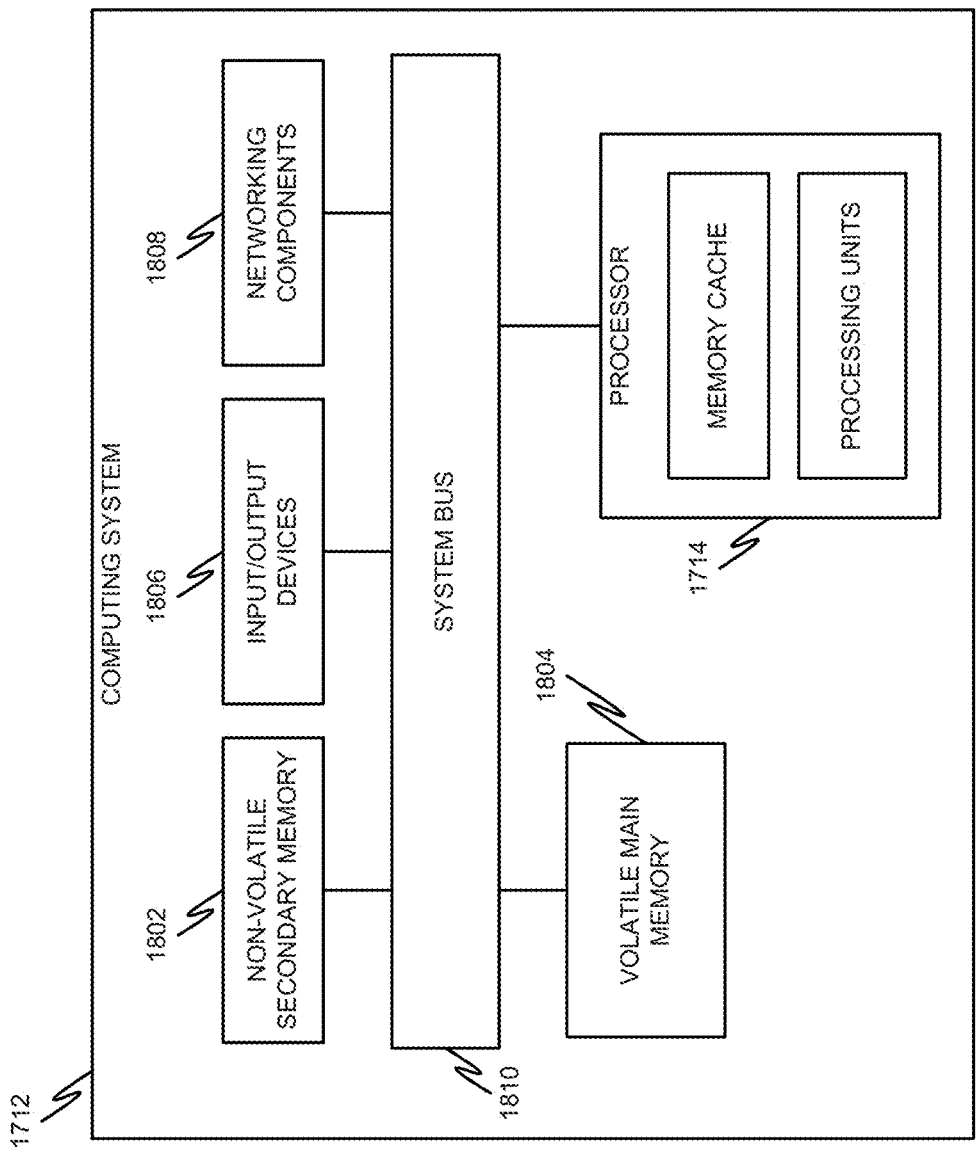
FIG. 18 is an example diagram showing a computing system for video encoding and decoding.

FIG. 18 is an example diagram showing a computing system for video encoding and decoding. As shown in FIG. 17, the computing system 1612 includes a processor 1614, memory devices 1702 and 1704, one or more input/output devices 1706, one or more networking components 1708, and a system bus 1710. In some embodiments, the computing system 1612 includes the video-encoding-and-decoding module 1718, and provides access to the video-encoding-and-decoding module 1718 to a user as a stand-alone computer.

According to one embodiment, a method for video encoding includes: analyzing one or more input images; obtaining a background image from the one or more input images; encoding the background image to obtain a background frame using an intra-frame-predictive-encoding method; decoding the background frame to obtain a reconstructed image of the background frame; obtaining a first image from the one or more input images; encoding at least partially the first image to obtain a refreshment frame using an inter-frame-predictive-encoding method based at least in part on a difference between the first image and the reconstructed image of the background frame; obtaining a second image from the one or more input images; encoding at least partially the second image to obtain a common frame using the inter-frame-predictive-encoding method based at least in part on differences between the second image and the reconstructed image of the background frame and between the second image and a reconstructed image of an adjacent preceding frame, or based at least in part on a difference between the second image and the reconstructed image of the adjacent preceding frame; and generating a video bit stream based at least in part on the background frame, the refreshment frame and the common frame.

According to another embodiment, a method for video decoding includes: analyzing a video bit stream to obtain a background frame, a refreshment frame and a common frame; decoding the background-frame bit stream using an intra-frame-predictive-decoding method of to obtain a reconstructed image of the background frame; decoding at least part of a refreshment frame using an inter-frame-predictive-decoding method based at least in part on the reconstructed image of the background frame to obtain a reconstructed image of the refreshment frame; and decoding at least part of a common frame using an inter-frame-predictive-decoding method based at least in part on the reconstructed image of the background frame and a reconstructed image of an adjacent preceding frame, or based at least in part on the reconstructed image of the adjacent preceding frame to obtain a reconstructed image of a common frame.

According to yet another embodiment, a device for video encoding includes: a background-image-acquisition module operable to analyze one or more input images and obtain a background image from the one or more input images; a background-frame-encoding module operable to encode the background image to obtain a background frame using an intra-frame-predictive-encoding method and decode the background frame to obtain a reconstructed image of the background frame; a refreshment-frame-encoding module operable to obtain a first image from the one or more input images and encode at least partially the first image to obtain a refreshment frame using an inter-frame-predictive-encoding method based at least in part on a difference between the first image and the reconstructed image of the background frame; a common-frame-encoding module operable to obtain a second image from the one or more input images and encode at least partially the second image to obtain a common frame using the inter-frame-predictive-encoding method based at least in part on differences between the second image and the reconstructed image of the background frame and between the second image and a reconstructed image of an adjacent preceding frame, or based at least in part on a difference between the second image and the reconstructed image of the adjacent preceding frame; a bit-stream-generation module operable to generate a video bit stream based at least in part on the background frame, the refreshment frame and the common frame.

In one embodiment, a device for video decoding includes: a bit-stream-analysis module operable to analyze a video bit stream to obtain a background frame, a refreshment frame and a common frame; a background-frame-decoding module operable to decode the background-frame bit stream using an intra-frame-predictive-decoding method of to obtain a reconstructed image of the background frame; a refreshment-frame-decoding module operable to decode at least part of a refreshment frame using an inter-frame-predictive-decoding method based at least in part on the reconstructed image of the background frame to obtain a reconstructed image of the refreshment frame; and a common-frame-decoding module operable to decode at least part of a common frame using an inter-frame-predictive-decoding method based at least in part on the reconstructed image of the background frame and a reconstructed image of an adjacent preceding frame, or based at least in part on the reconstructed image of the adjacent preceding frame to obtain a reconstructed image of a common frame.

In another embodiment, a system for video encoding includes: one or more data processors; and one or more non-transitory computer-readable storage media encoded with instructions for commanding the data processors to execute certain operations. The operations includes: analyzing one or more input images; obtaining a background image from the one or more input images; encoding the background image to obtain a background frame using an intra-frame-predictive-encoding method; decoding the background frame to obtain a reconstructed image of the background frame; obtaining a first image from the one or more input images; encoding at least partially the first image to obtain a refreshment frame using an inter-frame-predictive-encoding method based at least in part on a difference between the first image and the reconstructed image of the background frame; obtaining a second image from the one or more input images; encoding at least partially the second image to obtain a common frame using the inter-frame-predictive-encoding method based at least in part on differences between the second image and the reconstructed image of the background frame and between the second image and a reconstructed image of an adjacent preceding frame, or based at least in part on a difference between the second image and the reconstructed image of the adjacent preceding frame; and generating a video bit stream based at least in part on the background frame, the refreshment frame and the common frame.

In another embodiment, a system for video decoding includes: one or more data processors; and one or more non-transitory computer-readable storage media encoded with instructions for commanding the data processors to execute certain operations. The operations includes: analyzing a video bit stream to obtain a background frame, a refreshment frame and a common frame; decoding the background-frame bit stream using an intra-frame-predictive-decoding method of to obtain a reconstructed image of the background frame; decoding at least part of a refreshment frame using an inter-frame-predictive-decoding method based at least in part on the reconstructed image of the background frame to obtain a reconstructed image of the refreshment frame; and decoding at least part of a common frame using an inter-frame-predictive-decoding method based at least in part on the reconstructed image of the background frame and a reconstructed image of an adjacent preceding frame, or based at least in part on the reconstructed image of the adjacent preceding frame to obtain a reconstructed image of a common frame.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail. Also, the diagrams in the present disclosure are merely examples, which should not unduly limit the scope of the claims. One of ordinary skill in the art would recognize many variations, alternatives, and modifications.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A processor-implemented method for video encoding, the method comprising:
   analyzing, using one or more processors, one or more input images;
   obtaining, using the one or more processors, a background image from the one or more input images;
   encoding, using the one or more processors, the background image to obtain a background frame using an intra-frame-predictive-encoding method;
   decoding, using the one or more processors, the background frame to obtain a reconstructed image of the background frame;
   obtaining, using the one or more processors, a first image from the one or more input images;
   encoding, using the one or more processors, at least partially the first image to obtain a refreshment frame using an inter-frame-predictive-encoding method based at least in part on a difference between the first image and the reconstructed image of the background frame;
   obtaining, using the one or more processors, a second image from the one or more input images;
   encoding, using the one or more processors, at least partially the second image to obtain a common frame by:
      encoding a first portion of the second image both using the inter-frame-predictive-encoding method based at least in part on differences between the second image and the reconstructed image of the background frame and using the inter-frame-predictive-encoding method based at least in part on differences between the second image and a reconstructed image of an adjacent preceding frame, the adjacent preceding frame being different from the background frame, and
      encoding a second portion of the second image using the inter-frame-predictive-encoding method based at least in part on a difference between the second image and the reconstructed image of the adjacent preceding frame; and
   generating, using the one or more processors, a video bit stream based at least in part on the background frame, the refreshment frame and the common frame.

2. The method of claim 1, wherein obtaining the background image from the one or more input images includes:
   calculating foreground confidence degree information for pixels of consecutive input images; and
   setting an input image with the lowest foreground confidence degree as the background image.

3. The method of claim 2, wherein:
   calculating foreground confidence degree information for pixels of consecutive input images includes:
      outputting a background image marker based at least in part on the foreground confidence degree information of the consecutive input images, wherein the background image marker is used in designating the background image; and encoding the background image to obtain the background frame using the intra-frame-predictive-encoding method includes:
taking an input image corresponding to the output background image marker as the background image for encoding the background image to obtain the background frame using the intra-frame-predictive-encoding method.

4. The method of claim 1, wherein obtaining a first image from the one or more input images and encoding at least partially the first image to obtain a refreshment frame using an inter-frame-predictive-encoding method include:
obtaining one or more foreground confidence degrees for one or more pixels in a first image;
partitioning the first image into a foreground portion and a background portion based at least in part on comparison between the foreground confidence degrees and a threshold value;
encoding the foreground portion using an intra-frame-predictive-encoding method; and
encoding the background portion using an inter-frame-predictive-encoding method using the reconstructed image of the background frame as a reference image.

5. The method of claim 1, wherein obtaining a second image from the one or more input images and encoding at least partially the second image to obtain a common frame using the inter-frame-predictive-encoding method include:
obtaining one or more foreground confidence degrees of one or more pixels in the second image;
partitioning the second image into the first portion and the second portion based at least in part on comparison between the foreground confidence degrees and the threshold value, the first portion associated with confidence degrees less than the threshold value and the second portion associated with confidence degrees equal to or exceeding the threshold value;
encoding at least part of the second portion using an inter-frame-predictive-encoding method using a reconstructed image of an adjacent preceding frame as a reference image; and
encoding the first portion using an inter-frame-predictive-encoding method using the reconstructed image of the background frame and the reconstructed image of the adjacent preceding frame as reference images.

6. The method of claim 4, further comprising:
combining the foreground confidence degrees;
wherein combining the foreground confidence degrees includes:
determining an average value of foreground confidence degrees of one or more pixels within an input image block; and
setting the average value as a foreground confidence degree of the input image block.

7. The method of claim 4, further comprising:
combining the foreground confidence degrees;
wherein combining the foreground confidence degrees includes:
setting a foreground confidence degree with a highest occurrence probability in an input image block as a foreground confidence degree of the input image block.

8. The method of claim 4, further comprising:
combining the foreground confidence degrees;
wherein combining the foreground confidence degrees includes:
calculating a foreground confidence degree for a pixel in a compressed input image; and
setting the foreground confidence degree of the pixel as a foreground confidence degree for a corresponding block of the input image before the input image is compressed.

9. A device for video encoding, the device comprising:
background-image-acquisition instructions stored on non-transitory computer readable media which when executed by one or more processors cause the device to analyze one or more input images and obtain a background image from the one or more input images;
background-frame-encoding instructions stored on the non-transitory computer readable media which when executed by the one or more processors cause the device to encode the background image to obtain a background frame using an intra-frame-predictive-encoding method and decode the background frame to obtain a reconstructed image of the background frame;
refreshment-frame-encoding instructions stored on the non-transitory computer readable media which when executed by the one or more processors cause the device to obtain a first image from the one or more input images and encode at least partially the first image to obtain a refreshment frame using an inter-frame-predictive-encoding method based at least in part on a difference between the first image and the reconstructed image of the background frame;
common-frame-encoding instructions stored on the non-transitory computer readable media which when executed by the one or more processors cause the device to obtain a second image from the one or more input images and encode at least partially the second image to obtain a common frame by:
encoding a first portion of the second image using the inter-frame-predictive-encoding method based at least in part on differences between the second image and the reconstructed image of the background frame and using the inter-frame predictive-encoding method based at least in part on differences between the second image and a reconstructed image of an adjacent preceding frame, the adjacent preceding frame being different from the background frame, and
encoding a second portion of the second image using the inter-frame-predictive-encoding method based at least in part on a difference between the second image and the reconstructed image of the adjacent preceding frame; and
bit-stream-generation instructions stored on the non-transitory computer readable media which when executed by the one or more processors cause the device to generate a video bit stream based at least in part on the background frame, the refreshment frame and the common frame.

10. The device of claim 9, wherein the background-image-acquisition module includes:
background-analysis instructions stored on the non-transitory computer readable media which when executed by the one or more processors cause the device to calculate foreground confidence degree information for pixels of consecutive input images; and
a background-acquisition instructions stored on the non-transitory computer readable media which when executed by the one or more processors cause the device to set an input image with the lowest foreground confidence degree as the background image.

11. The device of claim 10, wherein:
the background-analysis instructions include: background-image-marker-output instructions which when executed by the one or more processors cause the device to output a background image marker based at least in part on the foreground confidence degree information of the consecutive input images, wherein the background image marker is used in designating the background image; and
the background-frame-encoding instructions when executed further cause the device to take an input image corresponding to the output background image marker as the background image for encoding the background image to obtain the background frame using the intra-frame-predictive-encoding method.

12. The device of claim 9, wherein the refreshment-frame-encoding instructions further include:
first foreground-confidence-degree-acquisition instructions which when executed by the one or more processors cause the device to obtain one or more foreground confidence degrees for one or more pixels in a first image;
first image-partitioning instructions stored on the non-transitory computer readable media which when executed by the one or more processors cause the device to partition the first image into a foreground portion and a background portion based at least in part on comparison between the foreground confidence degrees and a threshold value; and
refreshment-frame-encoding instructions stored on the non-transitory computer readable media which when executed by the one or more processors cause the device to encode the foreground portion using an intra-frame-predictive-encoding method and encode the background portion using an inter-frame-predictive-encoding method using the reconstructed image of the background frame as a reference image.

13. The device of claim 9, wherein the common-frame-encoding instructions further include:
a second foreground-confidence-degree-acquisition instructions stored on the non-transitory computer readable media which when executed by the one or more processors cause the device to obtain one or more foreground confidence degrees of one or more pixels in a second image;
a second image-partitioning instructions stored on the non-transitory computer readable media which when executed by the one or more processors cause the device to partition the second image into the first portion and the second portion based at least in part on comparison between the foreground confidence degrees and the threshold value, the first portion associated with confidence degrees less than the threshold value and the second portion associated with confidence degrees equal to or exceeding the threshold value; and
a common-frame-encoding instructions stored on the non-transitory computer readable media which when executed by the one or more processors cause the device to encode at least part of the second portion using an inter-frame-predictive-encoding method using a reconstructed image of an adjacent preceding frame as a reference image and encode the first portion using an inter-frame-predictive-encoding method using the reconstructed image of the background frame and the reconstructed image of the adjacent preceding frame as reference images.

14. The device of claim 12, further comprising:
confidence-degree-combination instructions stored on the non-transitory computer readable media which when executed by the one or more processors cause the device to combine the foreground confidence degrees;
wherein the confidence-degree-combination instructions further cause the device to:
determine an average value of foreground confidence degrees of one or more pixels within an input image block; and
set the average value as a foreground confidence degree of the input image block.

15. The device of claim 12, further comprising:
confidence-degree-combination instructions stored on the non-transitory computer readable media which when executed by the one or more processors cause the device to combine the foreground confidence degrees;
wherein the confidence-degree-combination instructions further cause the device to:
set a foreground confidence degree with a highest occurrence probability in an input image block as a foreground confidence degree of the input image block.

16. The device of claim 12, further comprising:
confidence-degree-combination instructions stored on the non-transitory computer readable media which when executed by the one or more processors cause the device to combine the foreground confidence degrees;
wherein the confidence-degree-combination instructions further cause the device to:
calculate a foreground confidence degree for a pixel in a compressed input image; and
set the foreground confidence degree of the pixel as a foreground confidence degree for a corresponding block of the input image before the input image is compressed.

17. A system for video encoding, the system comprising:
one or more data processors; and
one or more non-transitory computer-readable storage media encoded with instructions for commanding the data processors to execute operations including:
analyzing one or more input images;
obtaining a background image from the one or more input images;
encoding the background image to obtain a background frame using an intra-frame-predictive-encoding method;
decoding the background frame to obtain a reconstructed image of the background frame;
obtaining a first image from the one or more input images;
encoding at least partially the first image to obtain a refreshment frame using an inter-frame-predictive-encoding method based at least in part on a difference between the first image and the reconstructed image of the background frame;
obtaining a second image from the one or more input images;
encoding at least partially the second image to obtain a common frame by:
encoding a first portion of the second image using the inter-frame-predictive-encoding method based at least in part on differences between the second image and the reconstructed image of the background frame and using the inter-frame-predictive-encoding method based at least in part on differences between the second image and a reconstructed image of an adjacent preceding frame, the adjacent preceding frame being different from the background frame, and encoding a second portion of the second image using the inter-frame-predictive-encoding method based at least in part on a difference between the second image and the reconstructed image of the adjacent preceding frame; and generating, using the one or more processors, a video bit stream based at least in part on the background frame, the refreshment frame and the common frame.

18. The method for video encoding of claim 1, wherein obtaining a background image from the one or more input images comprises:

for a respective pixel of a plurality of background pixels forming the background image, calculating a foreground confidence degree for each of a plurality of input pixels, each respective input pixel being selected from a different one of a plurality of input images;

selecting a pixel value of an input pixel of the plurality of input pixels having a lowest calculated foreground confidence degree of the calculated foreground confidence degrees of each of the plurality of input pixels; and assigning the selected pixel value to the respective background pixel of the plurality of pixels forming the background image.

19. A processor-implemented method for video encoding, the method comprising:

analyzing, using one or more processors, one or more input images;

obtaining, using the one or more processors, a background image from the one or more input images;

encoding, using the one or more processors, the background image to obtain a background frame using an intra-frame-predictive-encoding method;

decoding, using the one or more processors, the background frame to obtain a reconstructed image of the background frame;

obtaining, using the one or more processors, a first image from the one or more input images;

encoding, using the one or more processors, at least partially the first image to obtain a refreshment frame using an inter-frame-predictive-encoding method based at least in part on a difference between the first image and the reconstructed image of the background frame;

encoding a plurality of common frames, wherein a first common frame after the refreshment frame is encoded differently from other common frames; and generating, using the one or more processors, a video bit stream based at least in part on the background frame, the refreshment frame and the plurality of common frames.

20. The method for video encoding of claim 19, wherein encoding the first common frame after the refreshment frame comprises using the refreshment frame and the background frame, and encoding other common frames comprises using an adjacent preceding frame and the background frame.

21. The method for video encoding of claim 19, wherein encoding the first common frame after the refreshment frame comprises using the first image, the reconstructed image of a background frame, and a reconstructed image of a refreshment frame, and encoding other common frames comprises using the first image, the reconstructed image of the background frame, and a reconstructed image of another common frame.

22. The method for video encoding of claim 19, wherein encoding the first common frame after the refreshment frame comprises using the reconstructed image of the background frame and a reconstructed image of the refreshment frame, and encoding other common frames comprises using the reconstructed image of the background frame and a reconstructed image of a preceding common frame.

* * * * *